(12) United States Patent
Marker et al.

(10) Patent No.: US 9,447,328 B2
(45) Date of Patent: Sep. 20, 2016

(54) HYDROPYROLYSIS OF BIOMASS FOR PRODUCING HIGH QUALITY LIQUID FUELS

(71) Applicant: GAS TECHNOLOGY INSTITUTE, Des Plaines, IL (US)

(72) Inventors: Terry L Marker, Palos Heights, IL (US); Larry G Felix, Pelham, AL (US); Martin B Linck, Mount Prospect, IL (US)

(73) Assignee: Gas Technology Institute, Des Plaines, IL (US)

( * ) Notice: Subject to any disclaimer, the term of this patent is extended or adjusted under 35 U.S.C. 154(b) by 343 days.

(21) Appl. No.: 13/843,367

(22) Filed: Mar. 15, 2013

(65) Prior Publication Data

US 2013/0338412 A1 Dec. 19, 2013

Related U.S. Application Data

(63) Continuation-in-part of application No. 12/419,535, filed on Apr. 7, 2009, now abandoned, and a continuation-in-part of application No. 12/685,352, filed on Jan. 11, 2010, now Pat. No. 8,492,600.

(51) Int. Cl.
*C10G 1/00* (2006.01)
*C07C 1/00* (2006.01)
(Continued)

(52) U.S. Cl.
CPC ............... *C10G 1/002* (2013.01); *C01B 3/34* (2013.01); *C01B 3/56* (2013.01); *C10G 3/42* (2013.01);
(Continued)

(58) Field of Classification Search
CPC ............. C01B 2203/0205; C01B 2203/0233; C01B 2203/0283; C01B 2203/042; C01B 2203/043; C01B 2203/0475; C01B 2203/0811; C01B 2203/0822; C01B 2203/0827; C01B 2203/1241; C01B 2203/1247; C01B 2203/1258; C01B 2203/148; C01B 3/34; C01B 3/56; C10G 1/002; C10G 2300/1011; C10G 2300/4018; C10G 2300/4081; C10G 2400/02; C10G 2400/04; C10G 3/42; C10G 3/46; C10G 3/50; C10G 3/60; C10K 3/04; C10K 1/32; C10L 1/04; Y02E 50/13
USPC .......................................................... 585/240
See application file for complete search history.

(56) References Cited

U.S. PATENT DOCUMENTS 3,625,664 A 12/1971 Padovani
3,997,423 A 12/1976 Greene
(Continued)

FOREIGN PATENT DOCUMENTS

CN 1473188 A 2/2004
JP S5981385 A 5/1984
(Continued)

OTHER PUBLICATIONS

Donald L. Klass, "Thermal Conversion: Pyrolysis and Liquefaction", Biomass for Renewable Energy, Fuels, and Chemicals, pp. 225-269.
(Continued)

*Primary Examiner* — Latosha Hines
(74) *Attorney, Agent, or Firm* — Banner & Witcoff, Ltd.

(57) ABSTRACT

A self-sustaining process for producing liquid fuels from biomass in which the biomass is hydropyrolyzed in a reactor vessel containing molecular hydrogen and a deoxygenating catalyst, producing a partially deoxygenated pyrolysis liquid, which is hydrogenated using a hydroconversion catalyst, producing a substantially fully deoxygenated pyrolysis liquid and a gaseous mixture comprising CO and light hydrocarbon gases ($C_1$-$C_4$). The gaseous mixture is reformed in a steam reformer, producing reformed molecular hydrogen, which is then introduced into the reactor vessel for hydropyrolizing the biomass. The deoxygenated liquid product is further processed to produce diesel fuel and gasoline.

24 Claims, 8 Drawing Sheets

(51) Int. Cl.
| | |
|---|---|
| C07C 4/00 | (2006.01) |
| C01B 3/34 | (2006.01) |
| C01B 3/56 | (2006.01) |
| C10L 1/04 | (2006.01) |
| C10G 3/00 | (2006.01) |
| C10K 1/32 | (2006.01) |
| C10K 3/04 | (2006.01) |

(52) U.S. Cl.
CPC . *C10G 3/46* (2013.01); *C10G 3/50* (2013.01); *C10G 3/60* (2013.01); *C10K 1/32* (2013.01); *C10K 3/04* (2013.01); *C10L 1/04* (2013.01); *C01B 2203/0205* (2013.01); *C01B 2203/0233* (2013.01); *C01B 2203/0283* (2013.01); *C01B 2203/042* (2013.01); *C01B 2203/043* (2013.01); *C01B 2203/0475* (2013.01); *C01B 2203/0811* (2013.01); *C01B 2203/0822* (2013.01); *C01B 2203/0827* (2013.01); *C01B 2203/1241* (2013.01); *C01B 2203/1247* (2013.01); *C01B 2203/1258* (2013.01); *C01B 2203/148* (2013.01); *C10G 2300/1011* (2013.01); *C10G 2300/4018* (2013.01); *C10G 2300/4081* (2013.01); *C10G 2400/02* (2013.01); *C10G 2400/04* (2013.01); *Y02E 50/13* (2013.01); *Y02P 20/128* (2015.11); *Y02P 30/20* (2015.11)

(56) References Cited

U.S. PATENT DOCUMENTS

| | | | |
|---|---|---|---|
| 4,013,543 A | 3/1977 | Greene | |
| 4,166,786 A | 9/1979 | Duraiswamy et al. | |
| 4,252,736 A | 2/1981 | Haag et al. | |
| 4,260,473 A | 4/1981 | Bauer | |
| 4,326,944 A | 4/1982 | Meyer et al. | |
| 4,371,727 A | 2/1983 | Gavin | |
| 4,597,776 A | 7/1986 | Ullman et al. | |
| 4,645,585 A | 2/1987 | White | |
| 4,808,289 A | 2/1989 | McDaniel et al. | |
| 4,822,935 A | 4/1989 | Scott | |
| 5,055,181 A | 10/1991 | Maa et al. | |
| 5,096,569 A | 3/1992 | Maa et al. | |
| 5,605,551 A | 2/1997 | Scott et al. | |
| 6,132,597 A * | 10/2000 | Harle et al. | 208/213 |
| 6,596,780 B2 | 7/2003 | Jahnke et al. | |
| 6,991,578 B2 | 1/2006 | Ziemer | |
| 7,018,319 B2 | 3/2006 | Ziemer | |
| 7,115,061 B2 | 10/2006 | Tiesler et al. | |
| 7,163,484 B2 | 1/2007 | Kiemen | |
| 7,201,698 B2 | 4/2007 | Gumpoltsberger | |
| 7,211,022 B2 | 5/2007 | Tiesler et | |
| 7,511,181 B2 | 3/2009 | Petri et al. | |
| 7,686,856 B2 | 3/2010 | Hemmings et al. | |
| 7,982,076 B2 | 7/2011 | Marker et al. | |
| 7,994,375 B2 | 8/2011 | Marker et al. | |
| 8,003,834 B2 | 8/2011 | Marker et al. | |
| 8,063,258 B2 | 11/2011 | Bartek et al. | |
| 8,084,655 B2 | 12/2011 | Dindi et al. | |
| 8,119,847 B2 | 2/2012 | Dindi et al. | |
| 8,217,210 B2 | 7/2012 | Agrawal et al. | |
| 8,475,549 B2 | 7/2013 | Vogel et al. | |
| 2003/0130360 A1 | 7/2003 | Kindig et al. | |
| 2006/0219403 A1 | 10/2006 | Steinberg | |
| 2006/0270513 A1 | 11/2006 | Klemen | |
| 2006/0270516 A1 | 11/2006 | Klemen | |
| 2007/0010588 A1 | 1/2007 | Pearson | |
| 2007/0119098 A1 | 5/2007 | Diaz et al. | |
| 2007/0225382 A1 | 9/2007 | Van Den Berg et al. | |
| 2008/0006519 A1 | 1/2008 | Badger | |
| 2008/0053870 A1 | 3/2008 | Marker et al. | |
| 2008/0115415 A1 | 5/2008 | Agrawal et al. | |
| 2008/0229653 A1 * | 9/2008 | Iversen et al. | 44/307 |
| 2008/0293537 A1 | 11/2008 | Phillips | |
| 2009/0082604 A1 | 3/2009 | Agrawal et al. | |
| 2009/0084666 A1 * | 4/2009 | Agrawal et al. | 201/2.5 |
| 2009/0126274 A1 | 5/2009 | Vogel et al. | |
| 2009/0163744 A1 * | 6/2009 | Abhari et al. | 568/876 |
| 2009/0299112 A1 * | 12/2009 | Bauer et al. | 585/242 |
| 2011/0219677 A1 | 9/2011 | Koyama et al. | |

FOREIGN PATENT DOCUMENTS

| | | |
|---|---|---|
| JP | 2007-153928 A | 6/2007 |
| JP | 2012-308564 A | 11/2007 |
| JP | 2009509759 A | 3/2009 |
| JP | 2011-515539 A | 5/2011 |
| JP | 2011-526640 A | 10/2011 |
| RU | 2124547 C1 | 1/1999 |
| WO | 88/01611 A1 | 3/1988 |
| WO | 00/21911 A1 | 4/2000 |
| WO | 2009/029660 A2 | 3/2009 |
| WO | 2009/038965 A1 | 3/2009 |
| WO | 2009124017 A2 | 10/2009 |
| WO | 2010058580 A1 | 5/2010 |
| WO | 2010117437 A1 | 10/2010 |

OTHER PUBLICATIONS

J.D. Rocha, et al. "Hydrodeoxygenation of Oils from Cellulose in Single and Two-Stage Hydropyrolysis" Renewable Energy, vol. 9, pp. 950-953, 1996.

Ayse E. Putun, et al. "Oil Production from an arid-land plant: fixed-bed pyrolysis and hydropyrolysis of Euphorbia rigida", Fuel, vol. 75 No. 11, pp. 1307-1312, 1996.

Japanese Patent Application No. 2012-504670 dated Nov. 8, 2013.

Chinese Patent Application No. 201180038507.0—Search Report dated Nov. 21, 2013.

European Application No. 11796075.7—Supplementary European Search Report dated Apr. 2, 2014.

Russian Application No. 2011144858—Decision of Grant dated Jul. 28, 2014.

Sephton, M. A. et al., "Hydropyrolysis of High Molecular Weight Organic Matter in Murchison", Lunar and Planetary Science XXXIV, 2003.

Guell, A. J. et al., "Effect of H2-Pressure on the Structures of Bio-oils from the Mild Hydropyrolysis of Biomass", Biomass and Bioenery, vol. 5., No. 2, pp. 155-171, 1993.

Rocha, J. Dilcio et al., "The Scope for Generating Bio-Oils with Relatively Low Oxygen Contents Via Hydropyrolysis", Organic Geochemistry, 30 (1999) 1527-1534.

Meier, D. et al., "Catalytic Hydroliquefaction of Spruce Wood—Elemental Balance and Effect of Catalyst", J Wood Chem Technology, vol. 8, No. 4, 1988 pp. 523-542.

Meier, D. et al. "Direct Catalytic Liquefaction Technology of Biomass Status and Review", Biomass Pyrolysis Liquids, 1991, pp. 93-102.

Meier, D. et al. "Effect of Hydrogen Pressure on Yields and Quality of Oils Obtained from Direct Liquefaction of Pine Wood", Energy From Biomass 4, 1989, pp. 584-592.

Meier D. et al., "High Liquid Yields from Lignin Via Catalytic Hydropyrolysis", Advances in Thermochemical Biomass Conversion, vol. 2, 1994, pp. 1016-1031.

Nikkhah, K. et al., "Co-pyrolysis of Various Biomass Materials and Coals", Energy from Biomass and Wastes, XVI, 1992, pp. 857-902.

Pindoria, R.V., et al., "A Two-Stage Fixed-Bed Reactor for Direct Hydrotreatment of Volatiles", Fuel, vol. 77, No. 15, Dec. 1998, pp. 1715-1726.

Scott, D.S., et al. "The Continuous Flash Pyrolysis of Biomass", Can J Chem Eng., vol. 62, No. 3, Jun. 1984, pp. 404-412.

Love, Gordon D. et al., "Release of covalently-bound alkane biomarkers in high yields from kerogen via catalytic hydropyrolysis", Org. Geochem., vol. 23, No. 10, pp. 981-986, 1995.

(56) References Cited

OTHER PUBLICATIONS

Oasmaa, et al. "Catalytic Hydrotreatment of Some Technical Lignins," Bioresource Technology (1993), vol. 45, pp. 189-194.

Meier et al. "Pyrolysis and Hydropyrolysis of Biomass and Lignins-Activities at the Institute of Wood Chemistry in Hamburg, Germany," Institute of Wood Chemistry and Chemical Technology of Wood (1996), pp. 298-303.

Elliott et al. "Catalytic Hydroprocessing of Biomass Fast Pyrolysis Bio-oil to Produce Hydrocarbon Products Environmental Progress and Sustainable Energy," Environmental Progress & Sustainable Energy (2009), vol. 28, No. 3, pp. 441-449.

Mohan et al. "Pyrolysis of Wood/Biomass for Bio-Oil: A Critical Review," Energy and Fuels (2006), vol. 20, pp. 848-889.

U.S. Appl. No. 12/815,743—Non-Final Office Action dated Jul. 2, 2013.

E. Putun, et al.: "Effect of Mass Transfer and Hydrogen pressure on the Fixed Bed Pyrolysis of Sunflower Bagasse", 1997, http:/web.anl.gov/PCS/acsfuel/preprint%20archive/Files/Merge/Vol-39_4-0002.pdf.

* cited by examiner

HYDROPYROLYSIS OF BIOMASS FOR PRODUCING HIGH QUALITY LIQUID FUELS

CROSS-REFERENCE TO RELATED APPLICATIONS

This application is a continuation-in-part of U.S. application Ser. No. 12/419,535, filed Apr. 7, 2009, now abandoned and a continuation-in-part of U.S. application Ser. No. 12/685,352, filed Jan. 11, 2010, now U.S. Pat. No. 8,492,600. The contents of these prior applications are hereby incorporated by reference in their entireties. International application PCT/US10/01020 (published as WO 2010/117437), filed Apr. 5, 2010, claims priority to U.S. application Ser. No. 12/419,535 and to U.S. application Ser. No. 12/685,352.

BACKGROUND OF THE INVENTION

1. Field of the Invention

This invention relates to an integrated process for thermochemically transforming biomass into high quality liquid fuels. As used herein, the term "biomass" refers to biological material derived from living or deceased organisms and includes lignocellulosic materials, such as wood, aquatic materials, such as algae, aquatic plants, seaweed, and animal by-products and wastes, such as offal, fats, and sewage sludge. In one aspect, this invention relates to a substantially self-sustaining process for creating high quality liquid fuels from biomass. In another aspect, this invention relates to a multi-stage hydropyrolysis process for creating high quality liquid fuels from biomass. In another aspect, this invention relates to a hydropyrolysis process for transforming biomass into high quality liquid fuels in which all of the process fluids are provided by the biomass. In another aspect, this invention relates to a hydropyrolysis process for transforming biomass into high quality liquid fuels in which the process outputs are substantially only liquid product and $CO_2$. In another aspect, this invention relates to an integrated process for producing gasoline and diesel fuels from biomass using a hydrocracking catalyst.

2. Description of Related Art

Conventional pyrolysis of biomass, typically fast pyrolysis, does not utilize or require $H_2$ or catalysts and produces a dense, acidic, reactive liquid product that contains water, oils, and char formed during the process. Because fast pyrolysis is most typically carried out in an inert atmosphere, much of the oxygen present in biomass is carried over into the oils produced in pyrolysis, which increases their chemical reactivity. The unstable liquids produced by conventional pyrolysis tend to thicken over time and can also react to a point where hydrophilic and hydrophobic phases form. Dilution of pyrolysis liquids with methanol or other alcohols has been shown to reduce the activity and viscosity of the oils, but this approach is not considered to be practical or economically viable, because large amounts of unrecoverable alcohol would be required to produce and transport large amounts of pyrolysis liquids.

In conventional pyrolysis carried out in an inert environment, the water miscible liquid product is highly oxygenated and reactive, with total acid numbers (TAN) in the range of 100-200, has low chemical stability for polymerization, is incompatible with petroleum hydrocarbons due to water miscibility and very high oxygen content, on the order of about 40% by weight, and has a low heating value. As a result, transport and utilization of this product are problematic and it is difficult to upgrade this product to a liquid fuel due to the retrograde reactions that typically occur in conventional pyrolysis and in conventional fast pyrolysis. In addition, the removal of char generated by conventional pyrolysis from the liquid pyrolysis product presents a technical challenge due to the large amounts of oxygen and free radicals in the pyrolysis vapors which remain highly reactive and form a pitch-like material when they come in intimate contact with char particles on the surface of a filter. Consequently, filters used to separate the char from the hot pyrolysis vapors blind quickly due to the reactions of char and oil that occur on and within the layer of char on the surface of the filter.

The upgrading of pyrolysis oils produced by conventional fast pyrolysis through hydroconversion consumes large quantities of $H_2$, and extreme process conditions make it uneconomical. The reactions are inherently out of balance in that, due to the high pressures required, too much water is created while too much $H_2$ is consumed. In addition, hydroconversion reactors often plug due to coke precursors present in the pyrolysis oils or from coke produced as a result of catalysis.

In general, hydropyrolysis is a catalytic pyrolysis process carried out in the presence of molecular hydrogen. Typically, the objective of conventional hydropyrolysis processes has been to maximize liquid yield in a single step. However, in one known case, a second stage reaction was added, the objective of which was to maximize yield while maintaining high oxygen removal. However, even this approach compromises economy, creates a system which requires an external source of $H_2$, and must be carried out at excessive internal pressures. In addition to requiring a continuous input of hydrogen, such conventional hydropyrolysis processes produce excessive $H_2O$ which must then be disposed of.

SUMMARY OF THE INVENTION

Accordingly, it is one object of this invention to provide a self-sustaining, balanced process for conversion of biomass to a liquid product via hydropyrolysis. By self-sustaining, we mean that, once initiated, the process requires no input of additional reactants, heat, or energy from external sources.

It is another object of this invention to provide a process for conversion of biomass to a liquid product using hydropyrolysis wherein the total output of the overall process is substantially only liquid product and $CO_2$. As used herein, the term "liquid product" refers to hydrocarbon products, typically —$C_5$+ liquids, produced by the process of this invention.

These and other objects of this invention are addressed by a multi-stage, self-sustaining process for producing liquid products from biomass in which the biomass is hydropyrolyzed in a reactor vessel containing molecular hydrogen and a deoxygenating catalyst, producing a partially deoxygenated pyrolysis liquid, char, and first-stage process heat. The partially deoxygenated pyrolysis liquid is hydrogenated using a hydroconversion catalyst, producing a substantially fully deoxygenated pyrolysis liquid, a gaseous mixture comprising CO and light hydrocarbon gases ($C_1$-$C_4$), and second-stage process heat. The gaseous mixture is then reformed in a steam reformer, producing reformed molecular hydrogen. The reformed molecular hydrogen is then introduced into the reactor vessel for the hydropyrolysis of additional biomass.

To provide a self-sustaining process, the hydropyrolysis and hydroconversion steps are operated at conditions under which about 30-70% or about 40-60% or of oxygen in the biomass is converted to $H_2O$ and about 30-70% or about 40-60% of the oxygen is converted to CO and $CO_2$. That is, the ratio of oxygen in $H_2O$ produced therein to the oxygen in the CO and $CO_2$ produced therein equals in the range of about 0.43 to about 2.2, or about 1. Preferably, process pressures for the hydropyrolysis and hydroconversion steps are in the range of about 100 psig to about 800 psig, or about 300 psig to about 800 psig, and are about the same for both steps. Pressures greater than about 800 psig result in a higher liquid product yield, which is the driving force behind the operating parameters employed by conventional processes for maximizing liquid product yield; however, such higher pressures also produce higher amounts of water, as a result of which the overall process is driven out of balance, requiring, for example, the introduction of additional hydrogen into the hydropyrolysis reactor vessel from an external source to complete the process. In addition, the excess water produced at the higher pressures must then be purified and disposed of. Preferably, temperatures for the hydropyrolysis and hydroconversion steps are in the range of about 650° F. to about 1000° F.

BRIEF DESCRIPTION OF THE DRAWINGS

These and other objects and features of this invention will be better understood from the following detailed description taken in conjunction with the drawings wherein.

DETAILED DESCRIPTION OF THE PRESENTLY PREFERRED EMBODIMENTS

Figure 1:
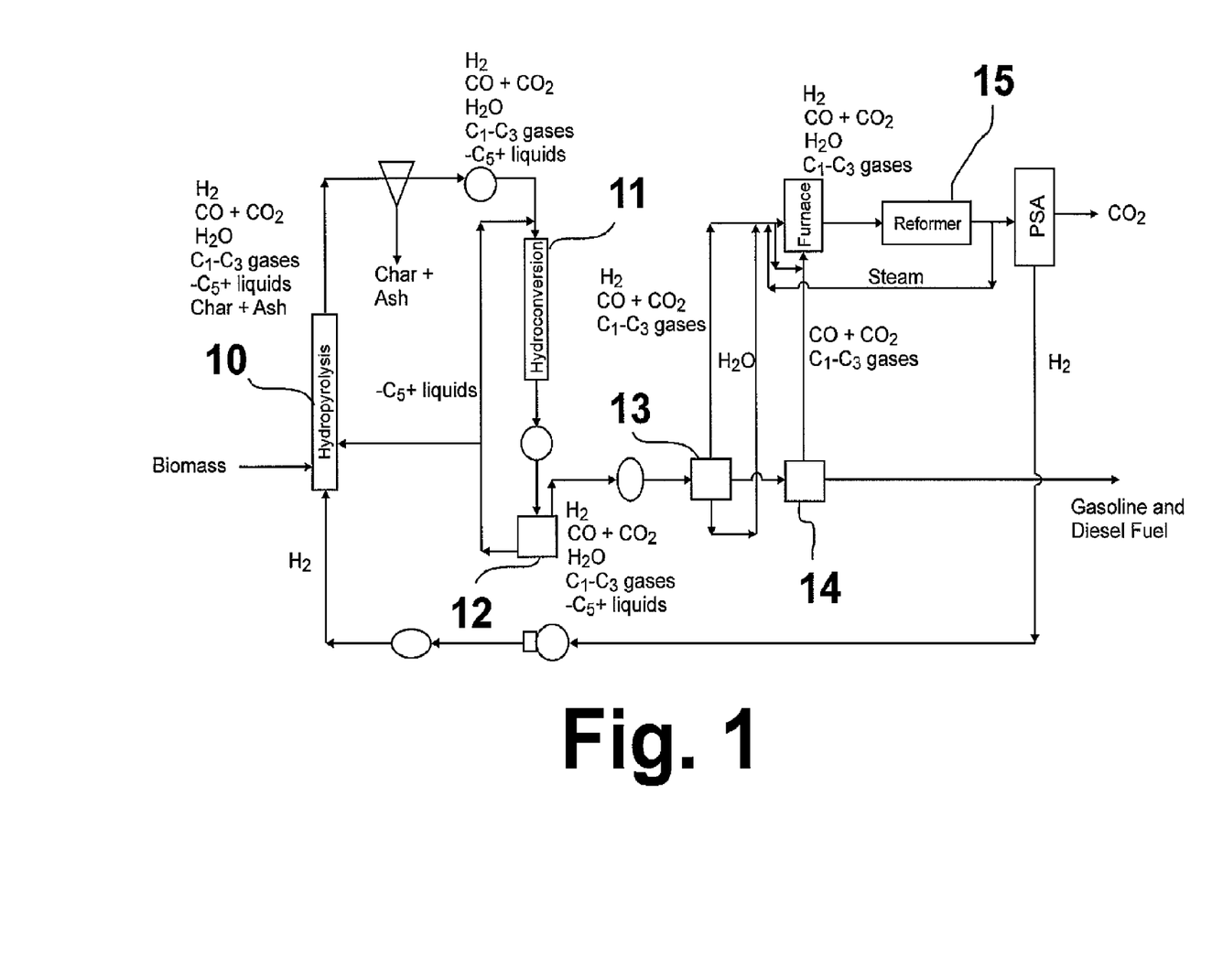
FIG. 1 is a schematic flow diagram of the self-sustaining process for producing liquid fuels from biomass in accordance with one embodiment of this invention.

The process of this invention, shown in FIG. 1, is a compact, balanced, integrated, multi-stage process for thermochemically transforming biomass into gasoline plus diesel liquid product suitable for use as a transportation fuel without the need for externally provided $H_2$, $CH_4$, or water. The first reaction stage or step of this process employs a pressurized, catalytically-enhanced, hydropyrolysis reactor vessel 10 to create a low-char, partially deoxygenated, hydropyrolysis liquid product from which the char is removed. The second reaction stage (subsequent to char removal) employs a hydroconversion reactor vessel 11 in which a hydroconversion step is carried out at substantially the same pressure as the first reaction stage. The product from the second reaction stage is then cooled and separated into liquid and gaseous fractions using high pressure separators 12, 13 and low pressure separator 14. CO plus $C_1$-$C_4$ light gases produced in the two stages are then steam reformed in a steam reformer 15 to produce $H_2$ using water which is also produced in the process. A key aspect of this invention is that the heat energy required in the process is supplied by the heat of reaction of the deoxygenation reaction, which is exothermic, occurring in both the first and second stages. Another key aspect of this invention is that the biomass feed need not be severely dried and, in fact, the addition of water either in the feed or as a separate feed is advantageous to the process because it enhances in-situ $H_2$ formation through a water-gas-shift reaction.

The integrated, balanced process of this invention is carried out under conditions which balance the levels of decarboxylation, decarbonylation, and hydrodeoxygenation so that 30-70% or 40-60% of the oxygen present in the biomass is rejected as CO and $CO_2$ and the remaining 30-70% or 40-60% of the oxygen in the biomass is rejected as $H_2O$ at the end of the process where it is easily separated from the hydrophilic liquid products produced by the process for use in the reforming process. Overall, after reforming of the light gases produced by the first two stages of the process with water produced by the process, over 95% of the oxygen in the process is rejected as $CO_2$.

The unique balancing of reactions is critical to the process of this invention and is achieved through the selection of appropriate catalysts and process conditions in each step. Although each step of the process of this invention can yield a variety of products depending on the catalyst, pressure, temperature, and time on stream employed, only when these processes are integrated in the specific series of steps and process conditions of this invention is it possible to provide a balanced process wherein all of the $H_2$, $CH_4$, and water demands of the overall process may be supplied by the biomass, which is critical for creating a fungible fuel that can be sold at a reasonable cost.

In the first step of the process of this invention shown in FIG. 1, biomass and molecular hydrogen are introduced into a reactor vessel 10 containing a deoxygenation catalyst in which vessel the biomass undergoes hydropyrolysis, producing an output comprising a low-char, partially deoxygenated, hydropyrolysis liquid product, pyrolysis vapors ($C_1$-$C_4$ gases), $H_2O$, CO, $CO_2$, and $H_2$. Although any reactor vessel suitable for hydropyrolysis may be employed, the preferred reactor vessel employs a fluidized bed reactor. The hydropyrolysis step employs a rapid heat up (greater than about 100 W/m$^2$) of the biomass feed such that the residence time of the pyrolysis vapors in the reactor vessel is less than about 5 minutes. In contrast thereto, the residence time of the char is relatively long because it is not removed through the bottom of the reactor vessel and, thus, must be reduced in particle size until the particles are sufficiently small to enable them to be carried out with the vapors exiting proximate the top of the reactor vessel.

The biomass feed utilized in the process of this invention may be in the form of loose biomass particles having a majority of particles preferably less than about 3 mm in size or in the form of a biomass/liquid slurry. However, it will be appreciated by those skilled in the art that the biomass feed may be pretreated or otherwise processed in a manner such that larger particle sizes may be accommodated. Suitable means for introducing the biomass feed into the hydropyrolysis reactor vessel include, but are not limited to, an auger, fast-moving (greater than about 5 m/sec) stream of carrier gas, such as inert gases and $H_2$, and constant-displacement pumps, impellers, or turbine pumps.

Hydropyrolysis is carried out in the reactor vessel at a temperature in the range of about 800° F. to about 1000° F. and a pressure in the range of about 100 psig to about 800 psig or about 300 psig to about 800 psig. Heating rate of the biomass is preferably greater than about 100 W/m². The weight hourly space velocity (WHSV) in gm biomass/gm catalyst/hr for this step is in the range of about 0.2 to about 10. In conventional hydropyrolysis processes, as previously noted, the objective is to maximize liquid product yield, which requires operation at substantially higher pressures, e.g. 2000 psig. This is because decarboxylation is favored at lower pressures whereas hydrodeoxygenation is favored at higher operating pressures. By maintaining pressures in the process of this invention in the range of 100 to 800 psig or 300 psig to 800 psig, most preferably at about 500 psig, decarboxylation and dehydrodeoxygenation are balanced, but liquid product yield is reduced. At higher pressures, hydrodeoxygenation is favored and the reactions become unbalanced.

As previously indicated, in the hydropyrolysis step of this invention, the solid biomass feed is rapidly heated, preferably in a hot fluidized bed, resulting in liquid product yields comparable to and possibly better than yields obtained with conventional fast pyrolysis. However, the pyrolysis vapors now are in the presence of a catalyst and a high partial pressure of $H_2$ within the fluidized bed, which provides hydrogenation activity and also some deoxygenation activity. Hydrogenation activity is very desirable for preventing reactive olefins from polymerizing, thereby reducing the formation of unstable free radicals. Similarly, deoxygenation activity is important so that the heat of reaction from pyrolysis is supplied by the exothermic deoxygenation reaction, thereby obviating the need for external heating. The advantage of hydropyrolysis over existing pyrolysis processes is that hydropyrolysis avoids the retrograde reactions of pyrolysis, which is usually carried out in an inert atmosphere, most certainly in the absence of $H_2$ and usually in the absence of a catalyst, thereby promoting the undesirable formation of polynuclear aromatics, free radicals and olefinic compounds that are not present in the original biomass.

The first stage hydropyrolysis step of this invention operates at a temperature hotter than is typical of a conventional hydroconversion process, as a result of which the biomass is rapidly devolatilized. Thus, the step requires an active catalyst to stabilize the hydropyrolysis vapors, but not so active that it rapidly cokes. Catalyst particles sizes are preferably greater than about 100 μm. Although any deoxygenation catalyst suitable for use in the temperature range of this process may be employed in the hydropyrolysis step, catalysts in accordance with preferred embodiments of this invention are as follows:

Glass-ceramics catalysts—Glass-ceramics catalysts are extremely strong and attrition resistant and can be prepared as thermally impregnated (i.e. supported) or as bulk catalysts. When employed as a sulfided NiMo, Ni/NiO, or Co-based glass-ceramic catalyst, the resulting catalyst is an attrition resistant version of a readily available, but soft, conventional NiMo, Ni/NiO, or Co-based catalyst. Glass-ceramic sulfided NiMo, Ni/NiO, or Co-based catalysts are particularly suitable for use in a hot fluidized bed because these materials can provide the catalytic effect of a conventional supported catalyst, but in a much more robust, attrition resistant form. In addition, due to the attrition resistance of the catalyst, the biomass and char are simultaneously ground into smaller particles as hydropyrolysis reactions proceed within the reaction vessel. Thus, the char that is ultimately recovered is substantially free of catalyst contaminants from the catalyst due to the extremely high strength and attrition resistance of the catalyst. The attrition rate of the catalyst will typically be less than about 2 weight % per hour, preferably less than 1 weight % per hour as determined in a standard, high velocity jet cup attrition test index test.

Nickel phosphide catalyst—Ni Phosphide catalysts do not require sulfur to work and therefore will be just as active in a sulfur-free environment as in an environment containing $H_2S$, COS and other sulfur-containing compounds. Therefore, this catalyst will be just as active for biomass which has little or no sulfur present as with biomass which does contain sulfur (e.g. corn stover). This catalyst may be impregnated on carbon as a separate catalyst or impregnated directly into the biomass feedstock itself.

Bauxite—Bauxite is an extremely cheap material and, thus, may be used as a disposable catalyst. Bauxite may also be impregnated with other materials such as Ni, Mo, or be sulfided as well.

Small size spray-dried silica-alumina catalyst impregnated with low amounts of NiMo or CoMo and sulfided to form a low activity hydroconversion catalyst—Commercially available NiMo or CoMo catalysts are normally provided as large size ⅛-1/16-inch tablets for use in fixed or ebullated beds. In the instant case, NiMo is impregnated on spray dried silica alumina catalyst and used in a fluidized bed. This catalyst exhibits lower activity with lower NiMo loadings than a conventional NiMo catalyst but would be of the right size for use in a fluidized bed.

In between the hydropyrolysis and hydroconversion steps, char is removed from the pyrolysis liquid product. Char removal has been a major barrier in conventional fast pyrolysis because the char tends to coat filters and react with oxygenated pyrolysis vapors to form viscous coatings which can blind hot process filters. Char may be removed in accordance with the process of this invention by filtration from the vapor stream, or by way of filtering from a wash step—ebullated bed. Backpulsing may be employed in removing char from filters, as long as the hydrogen used in the process of this invention sufficiently reduces the reactivity of the pyrolysis vapors. Electrostatic precipitation or a virtual impactor separator may also be used to remove char and ash particles from the hot vapor stream before cooling and condensation of the liquid product.

By virtue of their resistance to attrition, glass-ceramics catalysts are more easily separated from char by energetic inertial separation technologies that typically employ energetic impaction, interception, and/or diffusion processes sometimes combined with electrostatic precipitation to separate, concentrate, and collect char into a secondary stream for recovery. An additional virtue of these materials is that, because they are amenable to magnetic separation (in a reduced state, being attracted to a permanent or electrically-induced magnetic field), magnetic techniques as well as combinations of magnetic, inertial, and electrostatic means may be employed for separating char from these catalysts that are not possible with softer materials.

In accordance with one embodiment of this invention, hot gas filtration may be used to remove the char. In this case, because the hydrogen has stabilized the free radicals and saturated the olefins, the dust cake caught on the filters should be more easily cleaned than char removed in the hot filtration of the aerosols produced in conventional fast pyrolysis. In accordance with another embodiment of this invention, the char is removed by bubbling first stage product gas through a recirculating liquid. The recirculated liquid used is the high boiling point portion of the finished oil from this process and is thus a fully saturated (hydrogenated), stabilized oil having a boiling point typically above 650° F. Char or catalyst fines from the first reaction stage are captured in this liquid. A portion of the liquid may be filtered to remove the fines and a portion may be recirculated back to the first stage hydropyrolysis reactor. One advantage of using a recirculating liquid is that it provides a way to lower the temperature of the char-laden process vapors from the first reaction stage to the temperature desired for the second reaction stage hydroconversion step while removing fine particulates of char and catalyst. Another advantage of employing liquid filtration is that the use of hot gas filtration with its attendant, well-documented problems of filter cleaning is completely avoided.

In accordance with one embodiment of this invention, large-size NiMo or CoMo catalysts, deployed in an ebullated bed, are used for char removal to provide further deoxygenation simultaneous with the removal of fine particulates. Particles of this catalyst should be large, preferably about $\frac{1}{8}$-$\frac{1}{16}$ inch in size, thereby rendering them easily separable from the fine char carried over from the first reaction stage, which is typically less than 200 mesh (~70 micrometers).

After removal of the char, the pyrolysis liquid, together with $H_2$, CO, $CO_2$, $H_2O$, and $C_1$-$C_4$ gases from the first reaction stage hydropyrolysis step is introduced into a second stage reactor vessel 11 in which it is subjected to a second reaction stage hydroconversion step, which preferably is carried out at a lower temperature (500-850° F. or 600-800° F.) than the first reaction stage hydropyrolysis step to increase catalyst life and at substantially the same pressure (100-800 psig or 300-800 psig) as the first reaction stage hydropyrolysis step. The weight hourly space velocity (WHSV) for this step is in the range of about 0.2 to about 3. The catalyst used in this step should be protected from Na, K, Ca, P, and other metals present in the biomass which can poison the catalyst, which will tend to increase catalyst life. This catalyst also should be protected from olefins and free radicals by the catalytic upgrading carried out in the first reaction stage step. Catalysts typically selected for this step are high activity hydroconversion catalysts, e.g. sulfided NiMo and sulfided CoMo catalysts. In this reaction stage, the catalyst is used to catalyze a water-gas-shift reaction of $CO+H_2O$ to make $CO_2+H_2$, thereby enabling in-situ production of hydrogen in the second stage reactor vessel 11, which, in turn, reduces the hydrogen required for hydroconversion. NiMo and CoMo catalysts both catalyze the water-gas-shift reaction. The objective in this second reaction stage is once again to balance the deoxygenation reactions. This balancing is done by using relatively low pressures (100-800 psig or 300-800 psig) along with the right choice of catalyst. In conventional hydrodeoxygenation processes, pressures in the range of about 2000 psig to about 3000 psig are typically employed. This is because the processes are intended to convert pyrolysis oils, which are extremely unstable and difficult to process at lower pressures of $H_2$.

Following the hydroconversion step, the oil product will be substantially totally deoxygenated so that it can be directly utilized as a transportation fuel, after it is separated by means of high pressure separators 12, 13 and low pressure separator 14, by distillation into gasoline and diesel portions. A key aspect of this process is to adjust temperature and pressure and space velocity to balance the level of decarbonylation, decarboxylation and hydrodeoxygenation so that all the $H_2$ required for the process can be made by reforming the light gases that are produced within the process. If excessive hydrodeoxygenation occurs, then too much $H_2$ will be required for the process and the system will be driven out of balance. Likewise, if excessive decarboxylation or decarbonylation occurs, too much carbon will be lost to $CO_2$ and CO instead of being converted into liquid product, as a result of which liquid yields will be reduced.

After the hydroconversion step, the effluent therefrom is cooled substantially so that gasoline and diesel boiling materials condense and only the light gases remain in the vapor phase. These gases (containing CO, $CO_2$, $CH_4$, ethane, propane, butanes, heptanes, etc.) are sent to the steam reformer 15 together with water from the process for conversion into $H_2$ and $CO_2$. A portion of these gases are burned in a furnace or other combustor to heat up the remaining portion of gases to the operating temperature of the steam reformer, about 1700° F. Steam reformers require a 3/1 steam-to-hydrocarbon ratio in their feed to push the reaction equilibrium, but this is far more than the amount required for reaction. The steam is recovered and recycled around inside the steam reformer. The $CO_2$ is removed from the process by pressure swing absorption (PSA) and the $H_2$ is recirculated back to the first reaction stage (hydropyrolysis) of the process. The product liquid may be separated into diesel and gasoline fractions which are suitable for use as transportation fuels.

In addition, this process is also balanced with respect to water so that enough water is made in the process to provide all the water needed in the steam reforming step. In accordance with one embodiment of this invention, the amount of water employed is such that the overall process output contains substantially only $CO_2$ and liquid products, thereby avoiding an additional process step for excess water disposal. It will be appreciated by those skilled in the art that the use of steam reforming in combination with hydropyrolysis and hydroconversion steps as set forth herein only makes sense where the objective is to provide a self-sustaining process in which the ratio of $O_2$ in $H_2O$ to $O_2$ in CO and $CO_2$ produced by the process is about 1.0. In the absence of such an objective, steam reforming is not necessary because $H_2$ required for the hydropyrolysis step could still be provided by external sources. If one were to employ steam reforming in the absence of the objectives stated herein, one would not end up with the self-sustaining process of this invention in which the process output consists essentially of liquid product and $CO_2$.

In accordance with one embodiment of this invention, the heat generated in the second reaction stage may be used to supply all or part of the heat needed to drive the hydropyrolysis step in the first reaction stage. In accordance with one embodiment of this invention, the process also employs recirculation of the heavy finished products as a wash liquid in the second step as stated herein above to capture process fines exiting the first stage pyrolysis reactor and control the heat of reaction. In accordance with one embodiment of this invention, this liquid is also recirculated to the hydroconversion and possibly to the first stage hydropyrolysis step to regulate the generation of heat in each step. The rate of recirculation is preferably in the range of about 3-5 times the biomass feed rate. This is necessary because hydrodeoxygenation is a strongly exothermic reaction.

In accordance with one embodiment of this invention, the biomass feed is a high lipid containing aquatic biomass such as algae or an aquatic plant such as lemna, enabling production of the same deoxygenated diesel oil which may be made from lipids extracted from the algae or lemna plus additional gasoline and diesel which may be made from the remainder of the aquatic biomass. This is particularly attractive because lipid extraction is expensive. By contrast, conventional fast pyrolysis of algae and other aquatic biomass would be very unattractive because the uncontrolled thermal reactions characteristic of fast pyrolysis would degrade these lipids. Thus, the integrated process of this invention is ideal for aquatic biomass conversion because it may be carried out on aquatic biomass which is usually only partially dewatered and still produce high quality diesel and gasoline product.

The process of this invention provides several distinct advantages over conventional fast pyrolysis-based processes in that it produces a negligible to low-char, partially deoxygenated, stabilized product from which residual char can be easily separated by hot gas filtration or contacting with a recirculated liquid; clean, hot hydropyrolysis oil vapors can be directly upgraded to a final product in a close-coupled second catalytically-enhanced process unit operated at almost the same pressure as was employed upstream; and upgrading is carried out quickly before degradation can occur in the vapor produced from the hydropyrolysis step.

The liquid product produced by this process should contain less than 5% oxygen and preferably less than 2% oxygen with a low total acid number (TAN) and should exhibit good chemical stability to polymerization or a reduced tendency to reactivity. In the preferred embodiment of this invention wherein the total oxygen content of the product is reduced below 2%, the water and hydrocarbon phases will easily separate out in any normal separation vessel because the hydrocarbon phase has become hydrophobic. This is a significant advantage when compared to conventional pyrolysis in which the water is miscible with and mixed in with the highly oxygenated pyrolysis oil. Table 1 presents an estimated material balance for a balanced hydropyrolysis+hydroconversion process in accordance with this invention utilizing a mixed hardwood feed. Because the fungible fuels produced in the disclosed process have low oxygen content, any excess water produced from this process is relatively free of dissolved hydrocarbons and will likely contain less than 2000 ppm dissolved total organic carbon (TOC), rendering it suitable for irrigation in arid areas. Additionally, the finished hydrocarbon product now may be easily transportable, has a low total acid number (TAN), and excellent chemical stability. In conventional fast pyrolysis, the pyrolysis oils typically contain 50-60% oxygen in the form of oxygenated hydrocarbons and 25% dissolved water. Therefore, final products transportation costs for the integrated hydropyrolysis+hydroconversion process of this invention are less than half of the costs for conventional fast pyrolysis. Furthermore, water produced in the proposed process becomes a valuable byproduct especially for arid regions.

TABLE 1

Estimated Material Balance for a Balanced Hydropyrolysis + Hydroconversion Process Utilizing a Mixed Hardwood Feed*

| | Hydropyrolysis + hydroconversion balance, Wt % | Overall system process balance, Wt % |
|---|---|---|
| Biomass feed | 100 | 100 |
| $H_2$ feed | 3.7 | — |
| Gasoline + diesel product | 29 | 29 |
| Char product | 8 | 8 |
| Water | 22.5 | .7 |
| $CO_2$ | 27.5 | 59.4 |
| Hydrocarbon gas | 16.7 | 2.9 |

*All $H_2$ is made by reforming light gases and no external natural gas is required One of the disadvantages of the process of this invention as described herein above is that it produces n-hexane ($NC_6$) and n-pentane ($NC_5$) in quantity, which is gasoline boiling range material, but which is low in octane. In addition, with a cellulosic feedstock, the process produces a mostly very light gasoline boiling range material and not very much diesel fuel. One approach to processing the suite of fuels produced by this process would be to isomerize the $NC_5$ and $NC_6$ product in a petroleum refinery isomerization unit. However, $NC_5$ and $NC_6$ are very stable molecules, which conventionally require a very difficult multi-step process to turn them into higher boiling point components. The steps required would involve dehydrogenation to make olefins and then polymerization.

Figure 2:
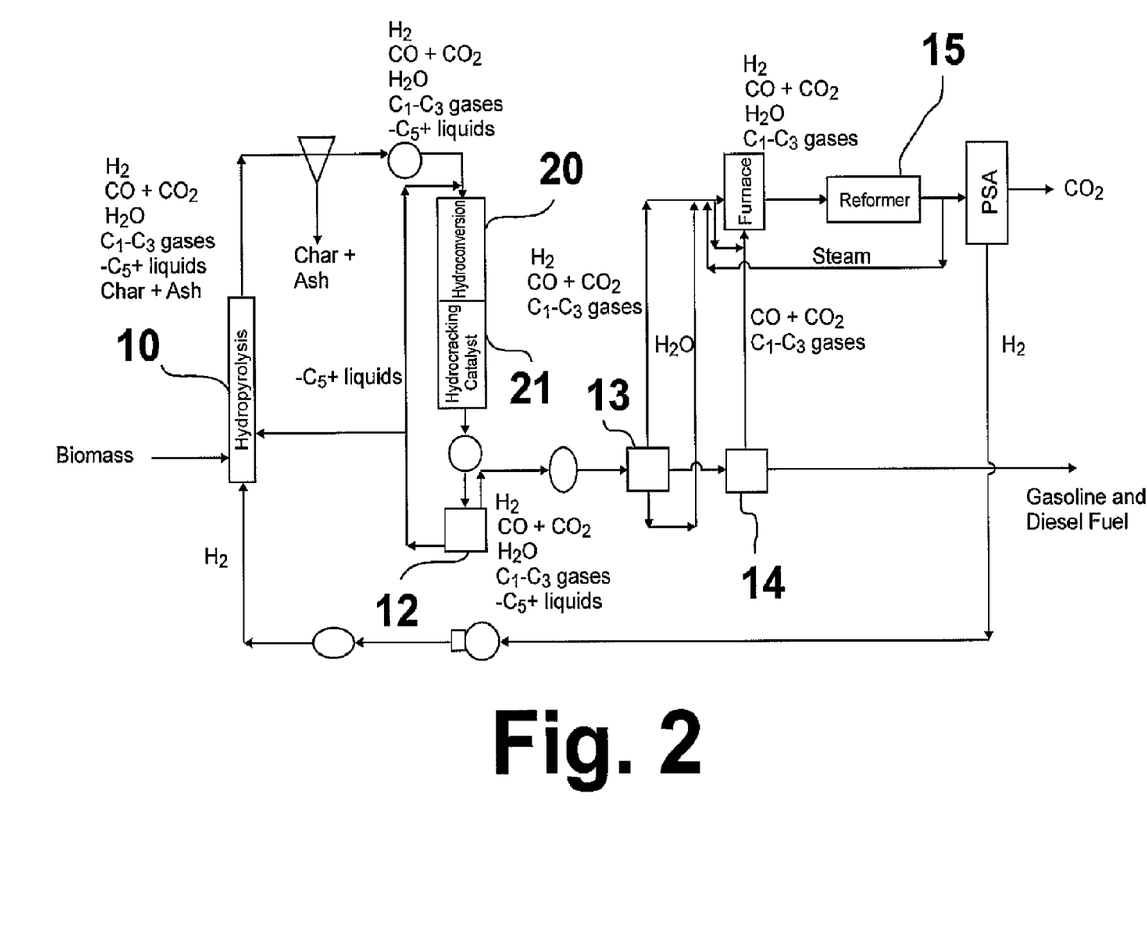
FIG. 2 is a schematic flow diagram of the self-sustaining process for producing liquid fuels from biomass utilizing a hydrocracking catalyst downstream of the hydroconversion step in accordance with one embodiment of this invention.
Figure 3:
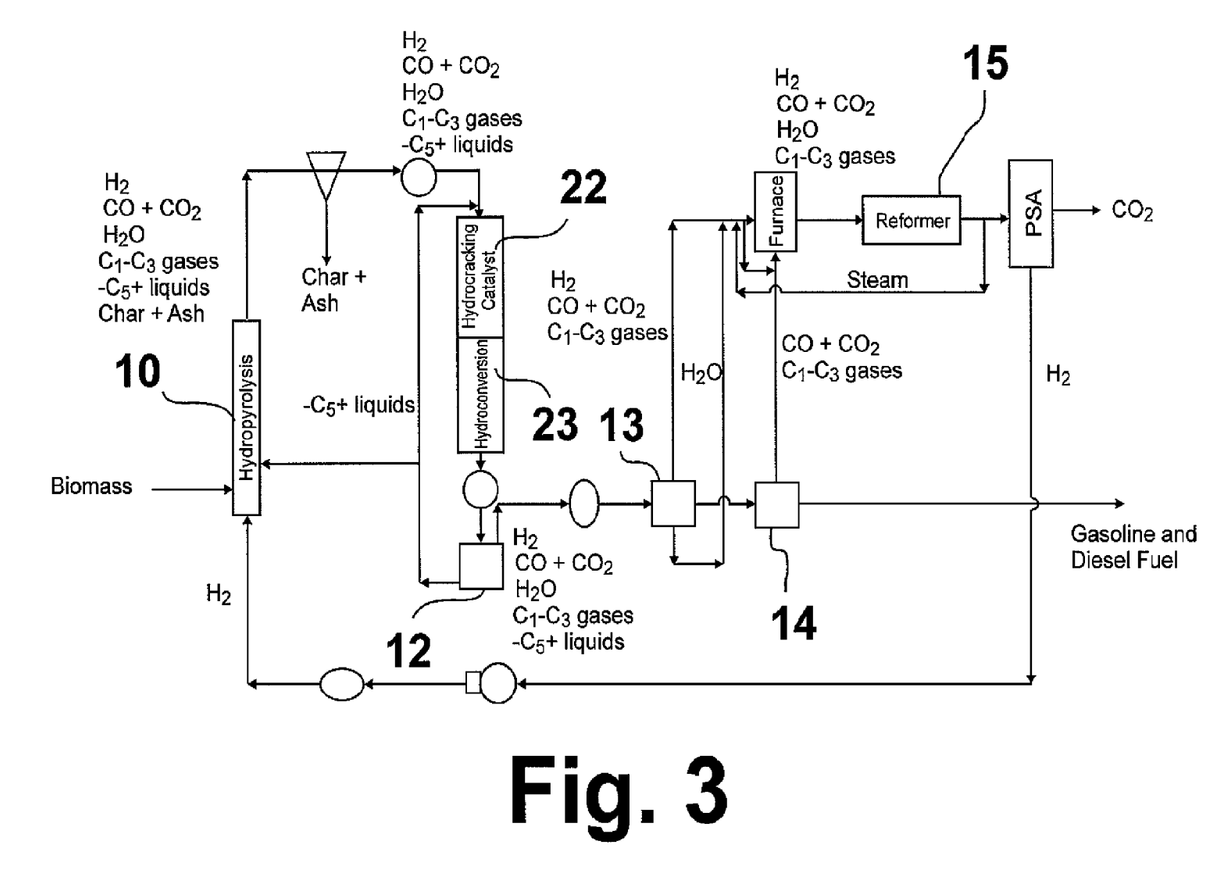
FIG. 3 is a schematic flow diagram of the self-sustaining process for producing liquid fuels from biomass utilizing a hydrocracking catalyst upstream of the hydroconversion step in accordance with one embodiment of this invention.
Figure 4:
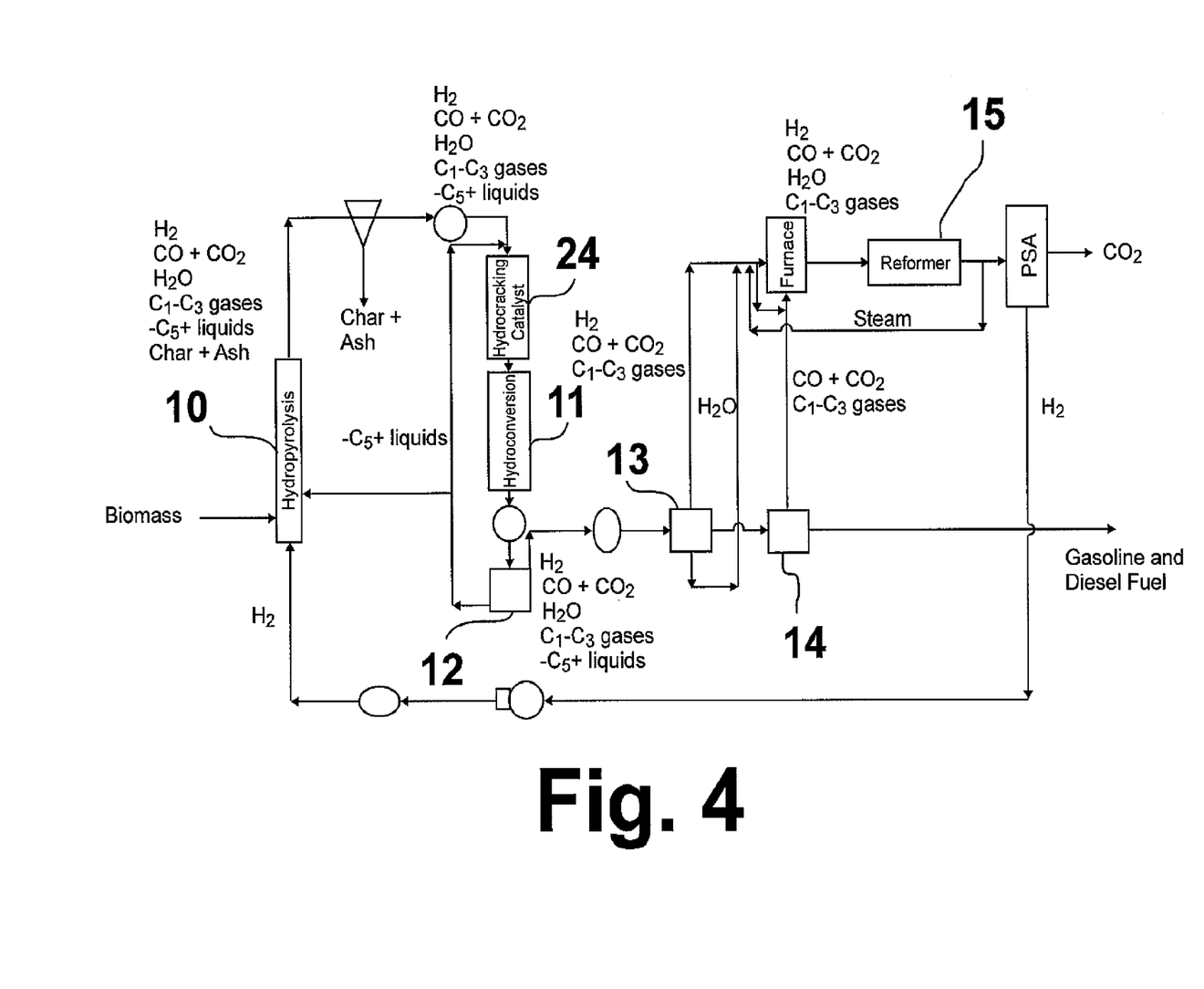
FIG. 4 is a schematic flow diagram of the self-sustaining process for producing liquid fuels from biomass utilizing a hydrocracking catalyst upstream of the hydroconversion step in accordance with another embodiment of this invention.
Figure 5:
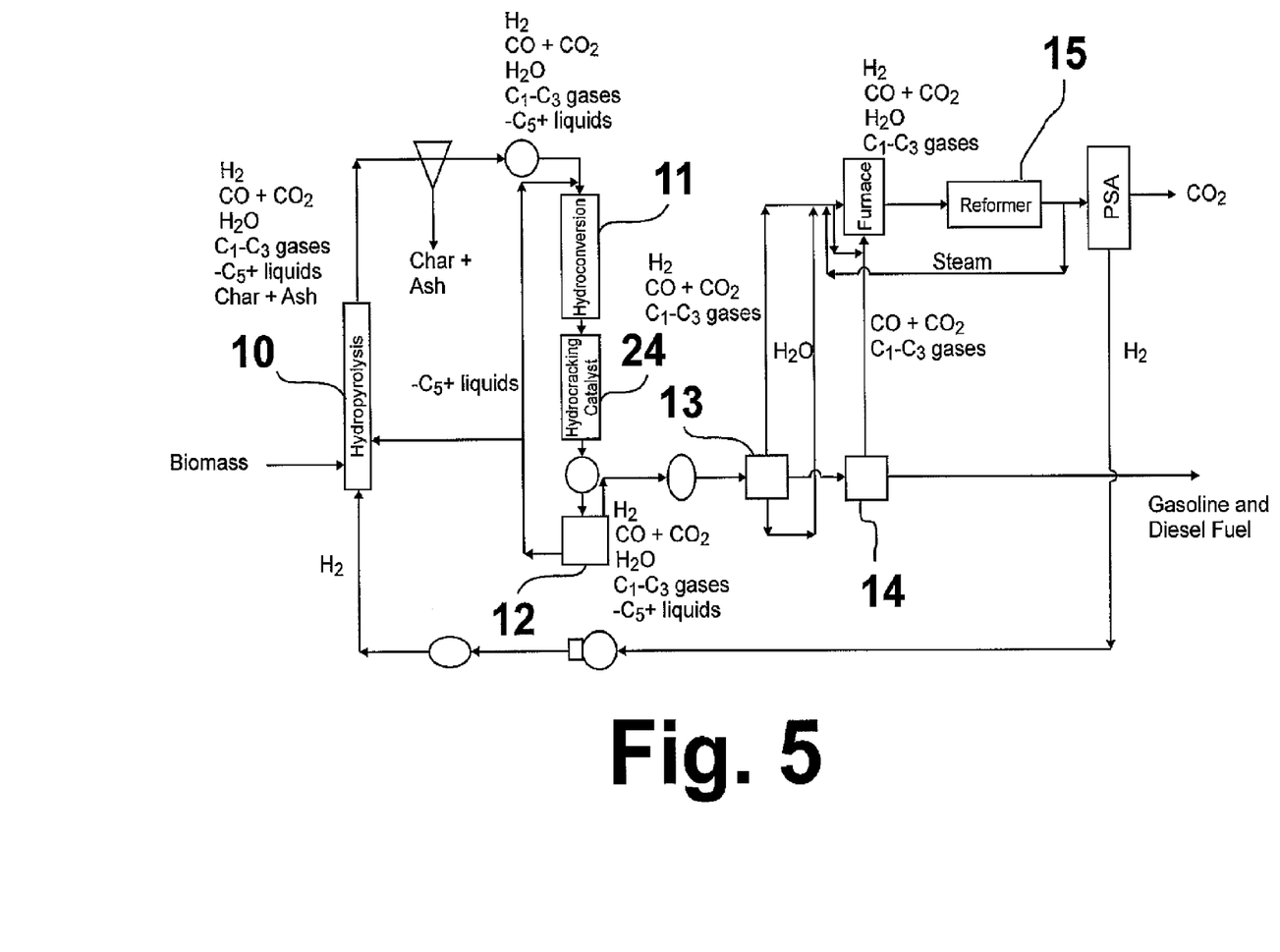
FIG. 5 is a schematic flow diagram of the self-sustaining process for producing liquid fuels from biomass utilizing a hydrocracking catalyst downstream of the hydroconversion step in accordance with one embodiment of this invention.

In accordance with one embodiment of this invention, a hydrocracking catalyst is provided upstream or downstream of the hydroconversion step, thereby isomerizing the normal pentane and normal hexane in the liquid products from the hydropyrolysis step into isopentane and isohexane, respectively, to increase the octane of the liquid products of the process. In accordance with one particularly preferred embodiment as shown in FIGS. 3 and 4, the hydrocracking catalyst is provided between the hydropyrolysis step and the hydroconversion step of the process and receives the products output by the hydropyrolysis step. In accordance with one embodiment as shown in FIG. 4, the hydrocracking catalyst is disposed within an upstream reactor vessel 24 upstream of the hydroconversion step reactor vessel 11. In accordance with another embodiment as shown in FIG. 3, the hydroconversion reactor vessel comprises two compartments, an upstream compartment 22 and a downstream compartment 23, in fluid communication with each other, and the hydrocracking catalyst is disposed in the upstream compartment in which the n-pentane and n-hexane from the hydropyrolysis step are converted to isopentane and isohexane, respectively, and the hydroconversion catalyst is disposed in the downstream compartment. In accordance with another embodiment of this invention as shown in FIGS. 2 and 5, the hydrocracking catalyst is provided downstream of the hydroconversion step. In accordance with one embodiment as shown in FIG. 2, the hydroconversion catalyst is provided in the upstream compartment 20 of the two compartment hydroconversion reactor vessel in which the partially deoxygenated pyrolysis liquid from the hydropyrolysis step of the integrated process is converted to a substantially fully deoxygenated pyrolysis liquid, a gaseous mixture comprising CO, $CO_2$, and light hydrocarbon gases ($C_1$-$C_4$), and the hydrocracking catalyst is provided in the downstream compartment 21. In accordance with one embodiment, the hydrocracking catalyst is disposed in a separate reactor vessel 24 as shown in FIG. 5.

Figure 8:
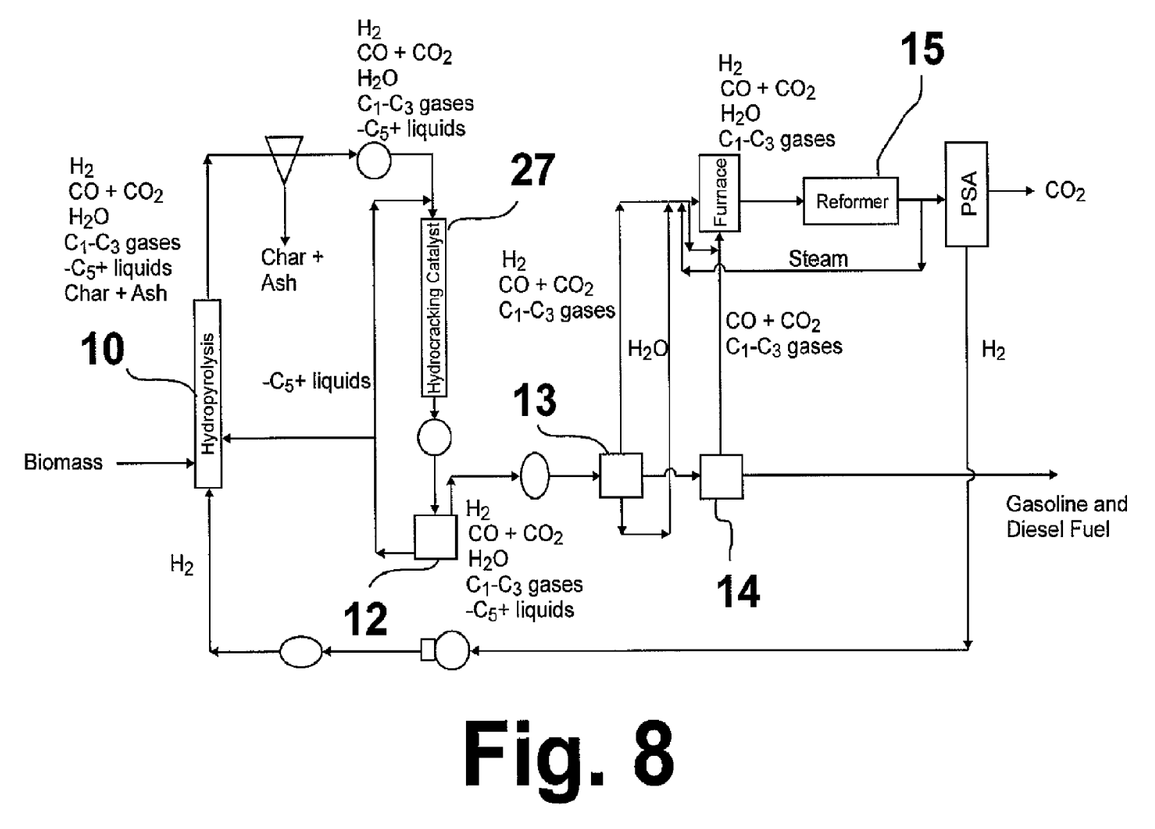
FIG. 8 is a schematic flow diagram of the self-sustaining process for producing liquid fuels from biomass utilizing a hydrocracking catalyst in place of the hydroconversion catalyst in accordance with one embodiment of this invention.

In accordance with one embodiment as shown in FIG. 8, the hydrocracking catalyst is disposed within a reactor vessel 27, replacing the hydroconversion reactor vessel and eliminating entirely the hydroconversion catalyst, in order to polymerize the oxygen containing molecules of the liquid product from the hydropyrolysis step while simultaneously removing the oxygen from the structure. As a result, the product may be shifted toward $C_{12}$ and $C_{18}$ products and away from the light gasoline boiling range molecules, thereby producing diesel boiling range materials which are particularly suitable for use in trucks and jet engines.

Figure 6:
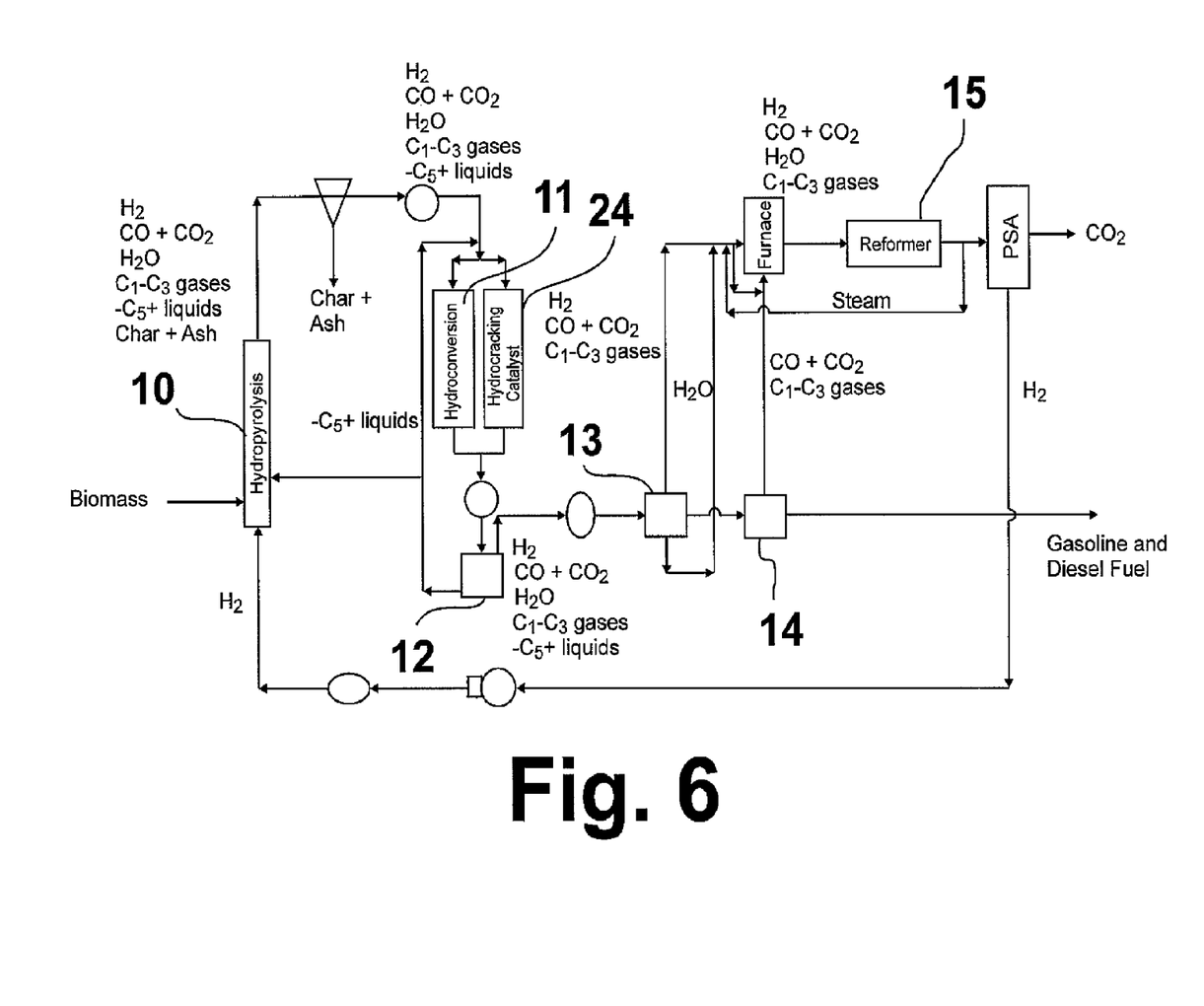
FIG. 6 is a schematic flow diagram of the self-sustaining process for producing liquid fuels from biomass utilizing a hydrocracking catalyst in parallel with the hydroconversion step in accordance with one embodiment of this invention.

In accordance with another embodiment of this invention as shown in FIG. 6, the hydrocracking catalyst may be disposed in a parallel reactor vessel 24 operating in parallel with the hydroconversion reactor vessel 11, thereby permitting controlled, simultaneous polymerization and isomerization, which would allow one process configuration for the production of either gasoline or diesel fuel as desired.

Figure 7:
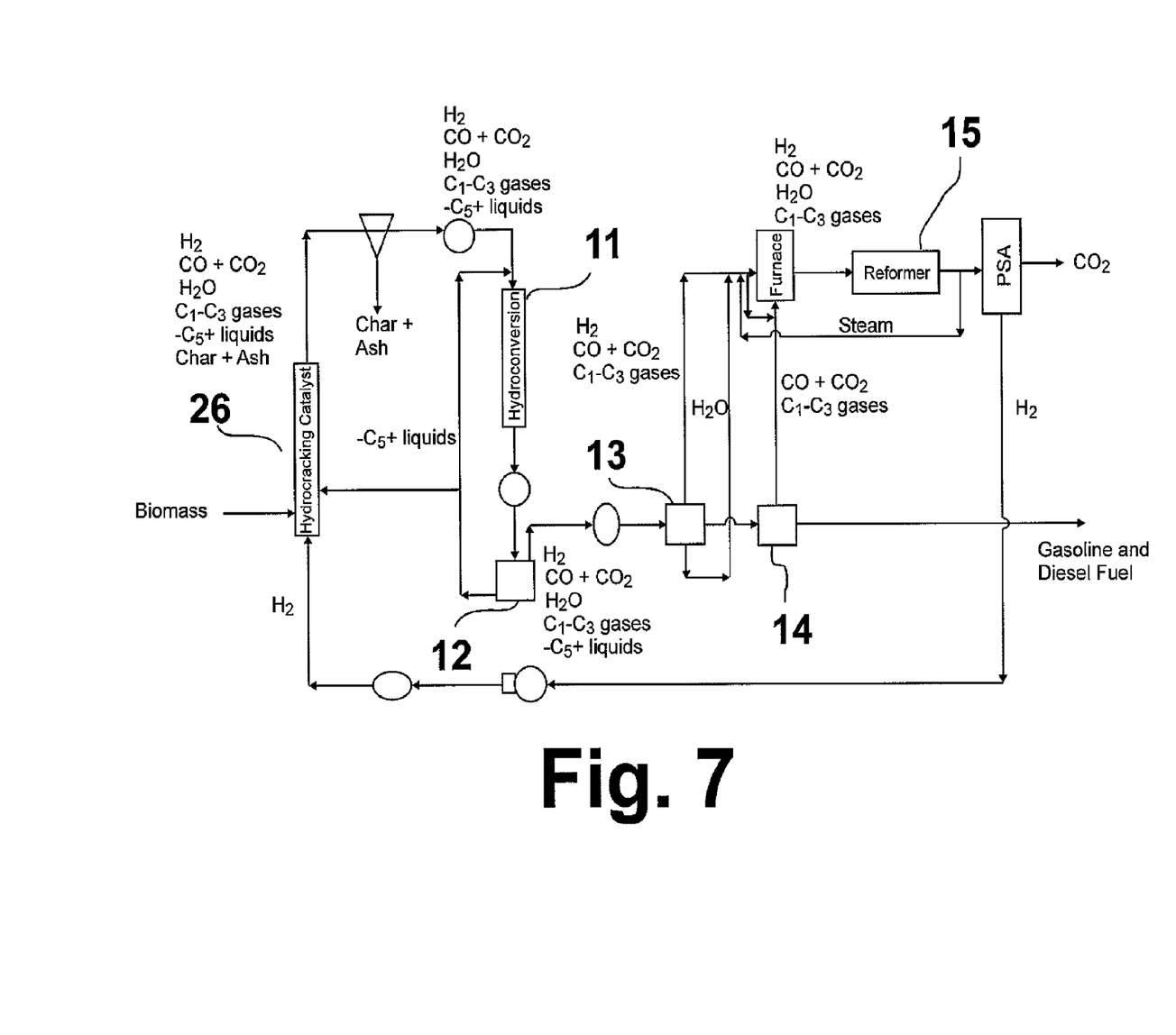
FIG. 7 is a schematic flow diagram of the self-sustaining process for producing liquid fuels from biomass utilizing a hydrocracking catalyst in place of the hydropyrolysis catalyst in accordance with one embodiment of this invention.

In accordance with yet a further embodiment of this invention as shown in FIG. 7, the hydrocracking catalyst is provided in a reactor vessel 26, replacing the hydropyrolysis reactor vessel.

Suitable hydrocracking catalysts for use in the process of this invention are acidic, metal-containing catalysts which provide both a hydrogenation function (from the metal) and an acidic function. Exemplary of such catalysts are CoMo, NiMo or NiW catalyst disposed on amorphous silica alumina, e.g. 75% $SiO_2$ and 25% $Al_2O_3$. Any bi-functional acidic, metal-containing catalysts which are capable of withstanding the operating conditions of the process of this invention may be employed.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

We claim:

1. A process for a producing a liquid hydrocarbon-containing product from biomass, the process comprising:
    (a) pyrolyzing the biomass in the presence of hydrogen and a deoxygenation catalyst to provide a hydropyrolysis effluent comprising a partially deoxygenated hydropyrolysis product and char, and
    (b) hydroconverting the partially deoxygenated hydropyrolysis product in the presence of a hydroconversion catalyst to provide a hydroconversion effluent comprising the liquid hydrocarbon-containing product, a water-containing product, and a gaseous mixture comprising CO and $C_1$-$C_3$ hydrocarbons, and
    (c) steam reforming at least a portion of the gaseous mixture,
    wherein deoxygenation in step (a) and hydroconversion in step (b) are carried out to an extent whereby the liquid hydrocarbon-containing product has an oxygen content of less than 2% by weight, such that the liquid-hydrocarbon-containing product is phase-separable from the water-containing product.

2. The process of claim 1, further comprising, in step (b) separating the liquid hydrocarbon-containing product from the water-containing product by phase separation.

3. The process of claim 2, wherein, following separation in step (b), the water-containing product contains less than 2000 ppm dissolved total organic carbon (TOC).

4. The process of claim 2, wherein steam reforming in step (c) is carried out using at least a portion of the water-containing product following separation from the liquid hydrocarbon-containing product.

5. The process of claim 4, wherein a net excess of the water-containing product is generated, beyond an amount used in the steam reforming step (c).

6. The process of claim 4, wherein the steam reforming step (c) generates a reformer effluent comprising $H_2$ and $CO_2$.

7. The process of claim 6, wherein the $H_2$ in the reformer effluent is utilized in the hydropyrolysis step (a).

8. The process of claim 7, wherein the reformer effluent is subjected to pressure swing absorption (PSA) to remove $CO_2$ and provide a PSA effluent comprising purified hydrogen that is utilized in hydropyrolysis step (a).

9. The process of claim 1, wherein the hydropyrolysis step (a) is carried out in a fluidized bed hydropyrolysis reactor.

10. The process of claim 9, wherein the deoxygenation catalyst has an attrition resistance of less than about 2 weight % per hour, as determined in a standard, high velocity jet cup attrition index test.

11. The process of claim 10, wherein the deoxygenation catalyst has an attrition resistance of less than about 1 weight % per hour, as determined in a standard, high velocity jet cup attrition index test.

12. The process of claim 1, wherein the deoxygenation catalyst and the hydroconversion catalyst are each independently selected from the group consisting of sulfided NiMo catalyst, sulfided CoMo catalyst, and mixtures thereof.

13. The process of claim 1, wherein the deoxygenation catalyst is used in a fluidized bed hydropyrolysis reactor and has a higher attrition resistance than the hydroconversion catalyst.

14. The process of claim 1, wherein the hydroconversion catalyst catalyzes a water-gas-shift reaction to produce hydrogen.

15. The process of claim 1, wherein the hydroconversion step (b) is carried out at a lower temperature than the hydropyrolysis step (a).

16. A process for a producing a liquid hydrocarbon-containing product from biomass, the process comprising:
    (a) pyrolyzing the biomass in the presence of hydrogen and a deoxygenation catalyst to provide a hydropyrolysis effluent comprising a partially deoxygenated hydropyrolysis product and char;
    (b) hydroconverting the partially deoxygenated hydropyrolysis product in the presence of a hydroconversion catalyst to provide a hydroconversion effluent comprising the liquid hydrocarbon-containing product, a liquid water-containing product, and a gaseous mixture comprising CO and $C_1$-$C_3$ hydrocarbons; and
    (c) steam reforming at least a portion of the gaseous mixture, using at least a portion of the liquid water-containing product,
    wherein the liquid hydrocarbon-containing product has an oxygen content of less than 5% by weight.

17. The process of claim 16, wherein the liquid water-containing product contains less than 2000 ppm dissolved total organic carbon (TOC).

18. A process for a producing a liquid hydrocarbon-containing product from biomass, the process comprising:
    a) pyrolyzing the biomass in the presence of hydrogen and a deoxygenation catalyst to provide a hydropyrolysis effluent comprising a partially deoxygenated hydropyrolysis product and char;

b) hydroconverting the partially deoxygenated hydropyrolysis product in the presence of a hydroconversion catalyst to provide a hydroconversion effluent comprising the liquid hydrocarbon-containing product, a water-containing product, and a gaseous mixture comprising CO and $C_1$-$C_3$ hydrocarbons, and separating the liquid hydrocarbon-containing product, the water-containing product, and the gaseous mixture; and c) steam reforming at least a portion of the gaseous mixture, using at least a portion of the water-containing product following separation in step (b), wherein (i) steam reforming step (c) generates sufficient $H_2$ for consumption in hydropyrolysis step (a) and hydroconversion step (b), and (ii) steps (a), (b), and (c) are operated with a net production of water.

19. The process of claim 1, wherein the pyrolyzing step (a) and hydroconverting step (b) are exothermic.

20. The process of claim 16, wherein the pyrolyzing step (a) and hydroconverting step (b) are exothermic.

21. The process of claim 18, wherein the pyrolyzing step (a) and hydroconverting step (b) are exothermic.

22. The process of claim 1, wherein, following steps (a), (b), and (c), over 95% of oxygen in the biomass is converted to $CO_2$.

23. The process of claim 16, wherein, following steps (a), (b), and (c), over 95% of oxygen in the biomass is converted to $CO_2$.

24. The process of claim 18, wherein, following steps (a), (b), and (c), over 95% of oxygen in the biomass is converted to $CO_2$.

* * * * *